Feb. 5, 1924.
H. R. CHURCHILL
1,482,784
HINGE FOR VEHICLE VISORS
Filed June 29, 1922
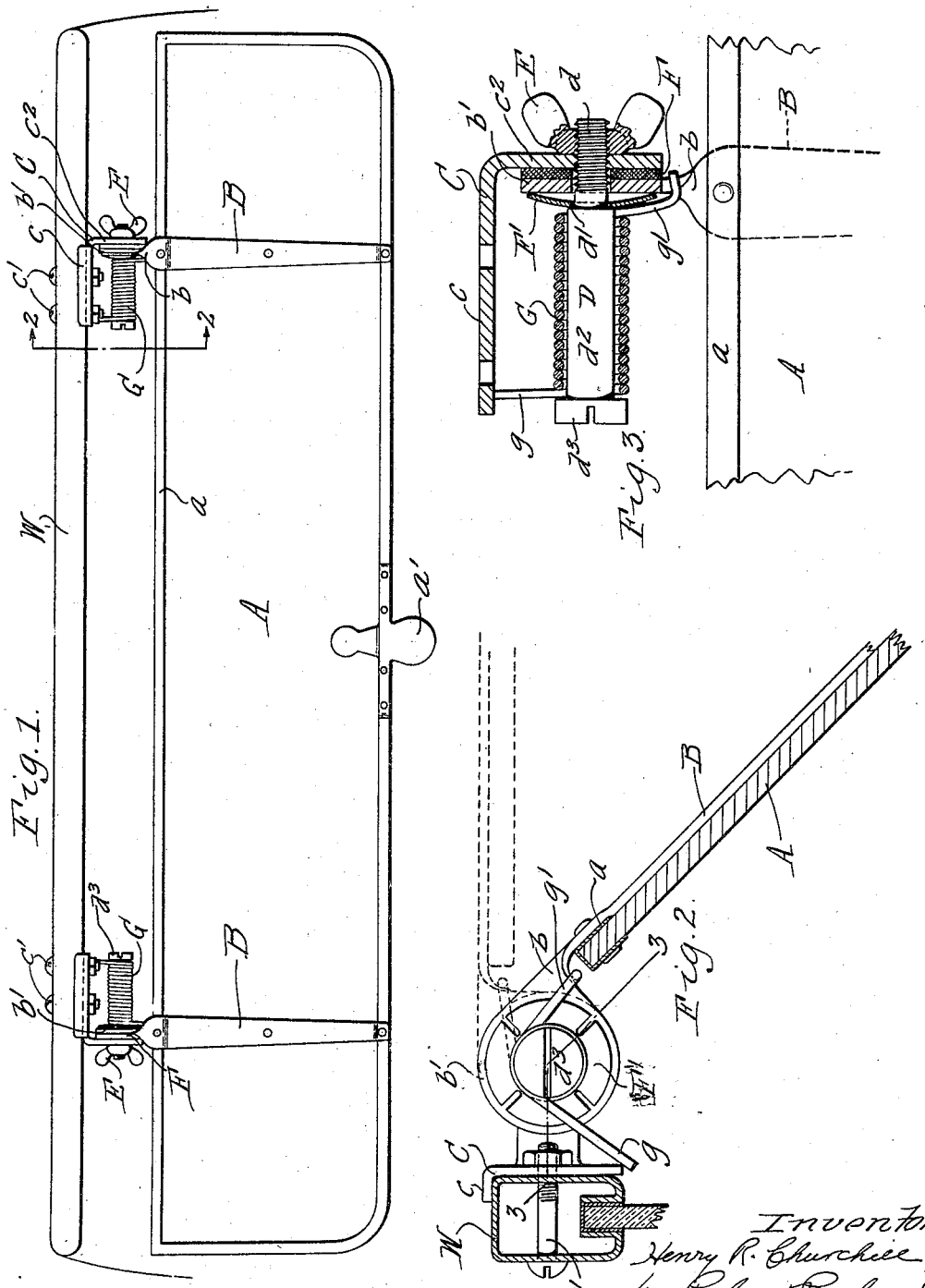
Inventor
Henry R. Churchill,
by Parker & Prochurd.
his Attorneys Patented Feb. 5, 1924.

1,482,784

UNITED STATES PATENT OFFICE.

HENRY R. CHURCHILL, OF BUFFALO, NEW YORK.

HINGE FOR VEHICLE VISORS.

Application filed June 29, 1922. Serial No. 571,826.

*To all whom it may concern:*

Be it known that I, HENRY R. CHURCHILL, a citizen of the United States, residing at Buffalo, in the county of Erie and State of New York, have invented a new and useful Improvement in Hinges for Vehicle Visors, of which the following is a specification.

This invention relates to hinges for vehicle visors, and more particularly to hinges of the kind which are adapted to hold the visor in various positions with reference to a windshield, in accordance with the requirements of the occupant of the vehicle.

In visors for vehicles, it is generally customary to provide the hinge with a locking device, such as a thumb screw or nut, for holding the visor in a definite position. If it is desired to change the position of the visor, it is necessary to release the locking device and then adjust the visor to the desired position, after which the locking device is again tightened.

One of the objects of this invention is to provide an improved hinge for vehicle visors which is so constructed that the visor will be yieldingly held in any position to which it is moved, so that in order to change the adjustment of the visor, it is only necessary to move the visor to the desired position. Other objects are to provide a hinge of this kind with a spring which counterbalances the weight of the visor in such a manner that very little friction is necessary to hold the visor in the desired position; also to provide a hinge of this kind in which the spring which counteracts the weight of the visor is of sufficient strength so that in case the frictional means for holding the visor in an adjusted position become loose, the visor will be swung upwardly out of the way by the spring, and consequently will not interfere with the free vision of the driver; also to improve the construction of hinges in other respects as hereinafter specified.

In the accompanying drawings:—

Fig. 1 is a top plan view of a visor secured to a windshield frame and provided with hinges embodying my invention.

Fig. 2 is a fragmentary sectional elevation thereof on an enlarged scale on line 2—2, Fig. 1.

Fig. 3 is a bottom plan view thereof showing the hinge in section on line 3—3, Fig. 2.

The hinge embodying the invention may be used in connection with any desired type of visor for windshields, the visor shown in the construction illustrated being intended for use inside of the vehicle in rear of the windshield, where it can be readily reached by the driver for adjusting the same. It is not intended, however, to limit the invention to use in connection with visors arranged on the inside of the vehicle.

A represents a visor which may be of any suitable or desired construction having a frame or binding $a$ surrounding the visor, and being provided with a handle or finger piece $a'$ by means of which the position of the visor may readily be adjusted, as desired. The visor is secured to a pair of arms B each of which forms one of the members of the hinge. In the particular construction shown, the visor supporting arms B are made of sheet metal and the outer portions thereof which engage the visor are arranged so as to lie flatly against the visor. The arms are twisted at $b$ so that the hinge portions or lugs $b'$ of the arms lie in a plane substantially at right angles to the plane of the outer portions of the arms.

Each of the hinges also includes a stationary hinge member C which also may be of any suitable or desired construction, that shown including a body portion $c$ which is so formed as to cooperate with the upper binding or frame member W of a windshield, or other part to which the visor is to be secured. In the particular construction shown, the portion $c$ of the stationary hinge member is secured to the upper portion of the frame or binding of the windshield by means of bolts $c'$ or the like. The stationary hinge member also has a hinge portion $c^2$ extending substantially at right angles to the body portion $c$. Both the hinge portions $c^2$ and $b'$ are provided with apertures having a pivot pin about which the arms B of the hinge may swing. In the particular construction shown, the aperture through the stationary hinge portion $c^2$ is threaded so as to cooperate with a threaded portion $d$ of a pivot pin D. The outer end of the threaded portion of the pivot pin is provided with a lock nut E for holding the pin against turning. The stationary hinge portion $c^2$ and the movable hinge portion $b'$ are separated by a friction washer F of any suitable material, and a spring washer F' is preferably inserted between a shoulder $d'$ of the pivot pin D and one of the hinge members to yieldingly press the two hinge portions into engagement with the friction washer F. All of these parts may be of any suitable or desired construction, and of themselves constitute no part of this invention.

In order to counteract the weight of the visor, means are provided which cooperate with the hinge to tend to swing the hinge arms B upwardly, and in the construction shown for this purpose, coil springs G are provided which are arranged about extensions $d^2$ of the pivot bolts D, and which are held in place on the pivot bolts by means of the heads $d^3$ of the bolts and the spring washers F'. Each of the springs is so arranged that one end $g$ of the spring engages a part of the stationary hinge member and the other end $g'$ thereof engages a part of the movable hinge member $b'$. It will be seen that by means of the construction described the spring is held in place on the hinge by the head of the hinge bolt and exerts a force on the movable hinge member tending to swing this hinge member upwardly. The spring is preferably made of such strength that the force exerted thereby is slightly more than is necessary to compensate for the weight of the visor, and consequently if the friction between the two hinge parts is not sufficient to hold the visor in position in which it is set, the visor will be swung upwardly and thus will not in any way obstruct the driver's vision. The arrangement of the spring G on the hinge also is desirable for the reason that the visor with the hinge may be shipped as a complete unit, and in applying the visor to a vehicle, it is only necessary to secure the stationary hinge members to the winddshield or other part of the vehicle. Since the spring G compensates for the weight of the visor, very little friction between the hinge parts is necessary in order to hold the visor in the desired position, and consequently the life of the hinge is much longer than hinges as heretofore constructed.

In order to adjust the amount of friction in the hinge, it is only necessary to loosen the lock nut E and turn the hinge bolt D so as to either increase or decrease the friction, whereupon the lock nut E is again tightened to hold the bolt in the desired position. A visor provided with hinges of the kind described has the advantage that it can be very easily adjusted as desired and furthermore, if conditions are such as to make the use of the visor unnecessary, the visor can be quickly swung upwardly against the roof of the vehicle, whereupon the vision of the occupants of the front seat is in no way obstructed. For example, in driving, if the car is suddenly turned into a road or street facing the sun, the visor can instantly be lowered into the desired position by the driver without making it necessary for him to stop the car or to adjust any thumb nuts or clamps. This can also be done to shield a driver from the glare from headlights while driving at night and if at any time the full vision through the windshield is desired, the visor can be instantly swung upwardly to its inoperative position.

I claim as my invention:

1. The combination with a vehicle and a visor therefor, of a friction hinge connecting the visor with a stationary part of the vehicle, and including a relatively stationary part secured to a fixed part of the vehicle and a movable part secured to said visor, a friction washer interposed between said hinge parts, a pivot bolt connecting said parts and having an elongated portion terminating in a head, and a coil spring on said elongated portion held in place by said head, said coil spring having arms engaging said stationary and movable hinge parts to exert an upward pressure on said movable hinge member to counteract the weight of said visor.

2. The combination with a vehicle and a visor therefor, of a friction hinge connecting the visor with a stationary part of the vehicle, and including a relatively stationary part secured to a fixed part of the vehicle and a movable part secured to said visor, a friction washer interposed between said hinge parts, a pivot pin connecting said hinge parts, a spring mounted on said hinge and including parts engaging said fixed and movable hinge parts to exert an upward pressure on said movable hinge member, a spring washer for yieldingly holding said hinge parts in frictional engagement with each other, said pivot bolt being adjustable to vary the tension on said spring washer, and a lock nut for holding said pivot bolt in any desired position.

HENRY R. CHURCHILL.